UNITED STATES PATENT OFFICE.

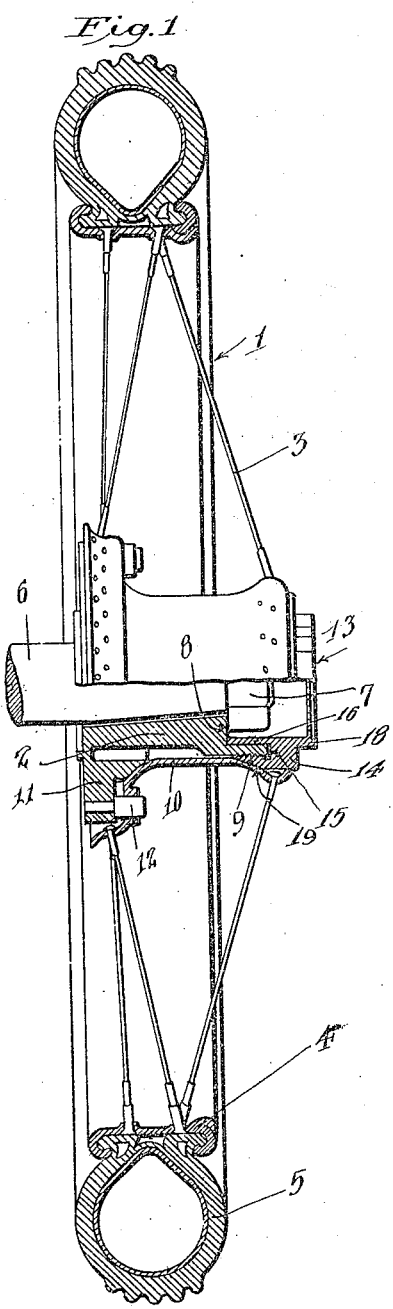
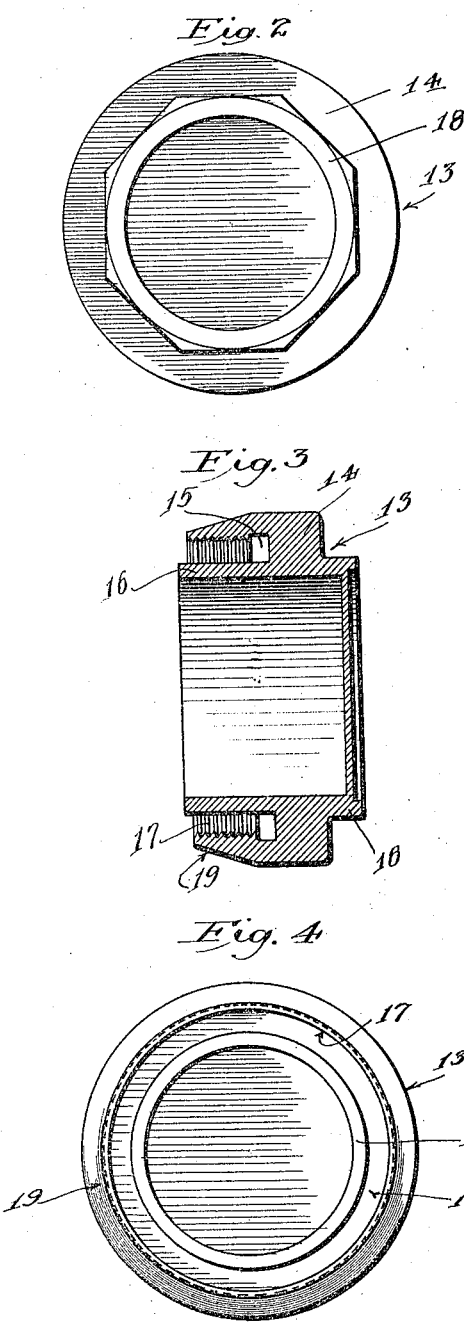

ROBERT B. HOUSLEY, OF LOS ANGELES, CALIFORNIA, ASSIGNOR OF ONE-HALF TO EVELYN HOUSLEY, OF LOS ANGELES, CALIFORNIA.

WHEEL-HUB.

1,262,952.   Specification of Letters Patent.   Patented Apr. 16, 1918.

Application filed March 6, 1917. Serial No. 152,562.

*To all whom it may concern:*

Be it known that I, ROBERT B. HOUSLEY, a citizen of the United States, residing at Los Angeles, in the county of Los Angeles and State of California, have invented a new and useful Wheel-Hub, of which the following is a specification.

This invention relates to improvements in hubs for wheels and more particularly to a hub cap.

In demountable wheels in which the hub cap is threaded upon the hub and serves as an element to assist in the retention of the wheel upon the hub, the screw-threads are often ruptured or "cross threaded" when the hub cap is carelessly or too rapidly turned upon the hub. This too rapid and careless turning of the hub cap is often occasioned in making a quick wheel change.

My invention obviates the cross-threading of the threads on the wheel or hub cap and permits of a quick wheel change without liability of injury to the screw-threads and resultant permanent damage to the wheel as a whole and consists in the provision of a hub cap constructed with a means to guide it while it is being turned or theaded upon the hub, such means adapted to seat against the hub and acting to center the cap so as to insure a perfect alinement of the screw-threads.

Other objects and advantages will appear in the course of the following description.

The accompanying drawings illustrate the invention:

Figure 1 is a sectional view taken through a demountable wheel showing the hub thereof broken away and in section and my hub cap in position thereon.

Fig. 2 is a front elevation of the hub cap.

Fig. 3 is a vertical sectional view of the hub cap; and

Fig. 4 is an inside face elevation of the hub cap.

Referring to the drawings, 1 designates as an entirety a demountable wheel comprising a hub 2, spokes 3, rim 4 and tire 5. In this type of wheel, the axle 6 extends through the hub and a nut 7 turned upon the outer end of the axle abuts an annular shoulder 8 formed on the hub. The shoulder 8 is formed by coring the outer end of the hub and said outer end is exteriorly screw-threaded at 9 to coöperate with the screw-threads on the hub cap, which will be later more fully described. A hub casing 10 surrounds the hub 2 and the hub cap is adapted to be wedged between the casing and hub so as to hold the wheel in position. The hub is provided with a flange 11 which is connected with the hub casing by a suitable means 12.

My improved hub cap 13 comprises a cylindrical body portion 14 which is formed with an annular recess or groove 15 opening upon its inner face. The forming of this recess 15 provides a cylindrical projection 16 which serves as a guide means in turning the cap upon the hub and said projection extends beyond the adjacent edge of the cap a slight distance, for example, one-sixteenth of an inch, so as to engage in the cored outer portion of the hub 2 prior to the contact of the adjacent edge of the cap with the hub. The outer annular face of the recess 15 is provided with screw-threads 17 adapted to coöperate with the screw-threads 9 on the hub 2 and said screw-threads terminate at a point spaced from the inner end of the recess so that when the cap is screwed upon the hub, the latter will be spaced from the inner end of the recess. The outer face of the hub is reduced to provide a hexagonal portion 18 adapted to be grasped by a wrench to effect the removal or placement of the cap upon the wheel. The periphery of the hub adjacent the inner side thereof is tapered inwardly as at 19 so as to effect a wedge between the hub casing 10 and hub 2, as shown in Fig. 1 of the drawings.

In operation, to secure the cap upon the wheel, the cylindrical guide projection 16 is inserted in the cored outer end of the hub 2 and since it is of a diameter slightly less than that of the inside diameter of the cored portion of the hub, it will act as a centering and guiding means for the cap and permit of its being turned rapidly and accurately into position. This projection 16 has a bearing upon the inner face of the cored portion of the hub and causes the screw-threads 17 and 9 to coöperate with each other properly and effect a secure fastening of the hub without any possibility of cross threading. It often occurs in making a quick change on racing cars, and other cars as well, that the wrench used to remove the cap is allowed to remain upon the cap so that when the new wheel is placed in position and the cap is screwed thereon, the cap is started with a wrench instead of by hand and in giving a start with a wrench it is turned rapidly and often inaccurately, causing the threads to be ruptured or crossed. With my hub cap all possibility of damage to the screw-threads is eliminated in view of the centering and guiding means provided by the cylindrical projection 16.

I claim:

1. An internally screw-threaded hub cap having a cylindrical smooth faced projection located within the cap in circumferentially spaced relation to the screw-threads thereon.

2. An internally screw-threaded hub cap having a cylindrical projection located inside of the flange of the cap in circumferentially spaced relation to the screw-threads thereon and projecting beyond the inner side of the hub cap.

3. The combination with a vehicle hub having external screw-threads on its outer end, of a hub cap adapted to be mounted upon the screw-threads and having internal screw-threads therein, and a guide means having a smooth hub-engaging face mounted upon the hub cap to engage the interior of the hub.

4. A hub cap comprising an internally screw-threaded body, and means interiorly of the body and spaced circumferentially from the screw-threaded portion thereof adapted to engage the interior of a hub and serve as a guide during the turning of the cap upon the hub.

5. The combination with a demountable wheel including a hub having external screw-threads upon its outer end, of a casing surrounding and secured to the hub, a hub cap having internal screw-threads and being turned upon the hub, said cap being engaged between the casing and hub, and a cylindrical projection carried by the hub cap and engaging the interior of the hub.

6. The combination with a demountable wheel including a hub having external screw-threads upon its outer end, of a casing surrounding and secured to the hub, a hub cap having internal screw-threads and being turned upon the hub, said cap being engaged between the casing and hub, and a cylindrical projection carried by the hub cap and engaging the interior of the hub, said projection being formed integral with the hub cap and extending beyond the inner side thereof so as to engage the hub in advance of the screw-threaded portion of the cap when turning the cap upon the hub.

7. A hub cap comprising a body portion having an annular recess formed therein and opening upon the inner face thereof, the outer annular wall of said recess being screw-threaded and the inner annular wall of the recess extending beyond the outer wall.

8. A hub cap comprising a body portion having an annular recess formed therein and opening upon the inner face thereof, the outer annular wall of said recess being screw-threaded and the inner annular wall of the recess extending beyond the outer wall, said body being inwardly tapered upon the periphery thereof adjacent to its inner side.

9. The combination with a hub having an externally screw-threaded hollow outer end, of a hub cap having internal screw-threads mounted upon the hub, and a cylindrical smooth faced projection carried by the hub cap and extending into the hollow end of and engaging the inner face of the hub.

Signed at Los Angeles, California, this 24th day of February, 1917.

ROBERT B. HOUSLEY.

Witnesses:
CHAS. J. CHUNN,
L. BELLE WEAVER.